United States Patent [19]

Moll et al.

[11] 4,297,221
[45] Oct. 27, 1981

[54] PROCESS AND APPARATUS FOR THE TREATMENT OF UNTREATED WATER

[76] Inventors: Hans-Georg Moll, Görzallee 49a, 1000 Berlin 45; Ulrich Hässelbarth, Adolfstrasse 3, 1000 Berlin 37; Andreas Grohmann, Drakestrasse 52a, 1000 Berlin 45; Helmüt Marks, Maulbeerallee 34, 1000 Berlin 20, all of Fed. Rep. of Germany

[21] Appl. No.: 74,665

[22] Filed: Sep. 12, 1979

[51] Int. Cl.³ .................. B01D 21/01; B01D 21/02
[52] U.S. Cl. .................. 210/702; 210/738; 210/801; 210/207; 210/521; 210/512.1
[58] Field of Search ............ 210/42 R, 49, 83, 84, 210/205, 207, 208, 304, 305, 320, 512 R, 521, 532 R, 702, 714, 715, 738, 788, 801

[56] References Cited

U.S. PATENT DOCUMENTS

| | | | |
|---|---|---|---|
| 2,364,405 | 12/1944 | Trimbey et al. | 210/84 |
| 2,377,545 | 6/1945 | Felsecker | 210/208 |
| 2,777,581 | 1/1957 | Unthank | 210/632 R |
| 2,969,225 | 1/1961 | Jenks | 210/304 |
| 3,006,474 | 10/1961 | Fitch | 210/304 |
| 3,239,066 | 3/1966 | Schick | 210/532 R |
| 3,545,621 | 12/1970 | Lamort | 210/304 |

*Primary Examiner*—Peter A. Hruskoci
*Attorney, Agent, or Firm*—Basile, Weintraub & Hanlon

[57] ABSTRACT

A process and apparatus for the treatment of untreated water. The untreated water mixed with a flocculating agent is introduced tangentially into the circumferential area of a tank through a feed connection directed at the tank wall. The tank includes a perforated partition circumferentially spaced from the wall of the tank and a conduit in the center of the tank which passes axially through the tank bottom and whose upper end carries a circular overflow disc located below the water level of the tank. Alternately, the partition comprises upper and lower rings, between which there are disposed guide plates which form openings distributed over the circumference of the partition. The circumferential speed of the water flowing through the partition is reduced by braking such that the occurrence of upwardly directed, secondary flows is prevented and clean water is led downward through the center of the tank.

6 Claims, 4 Drawing Figures

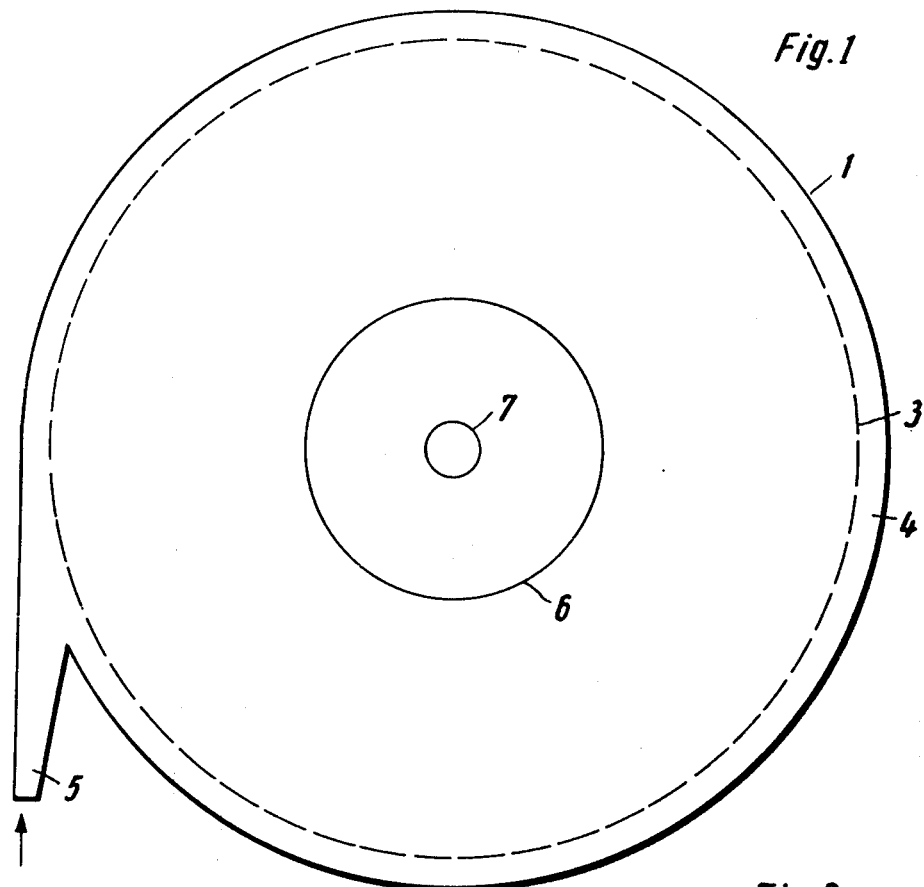
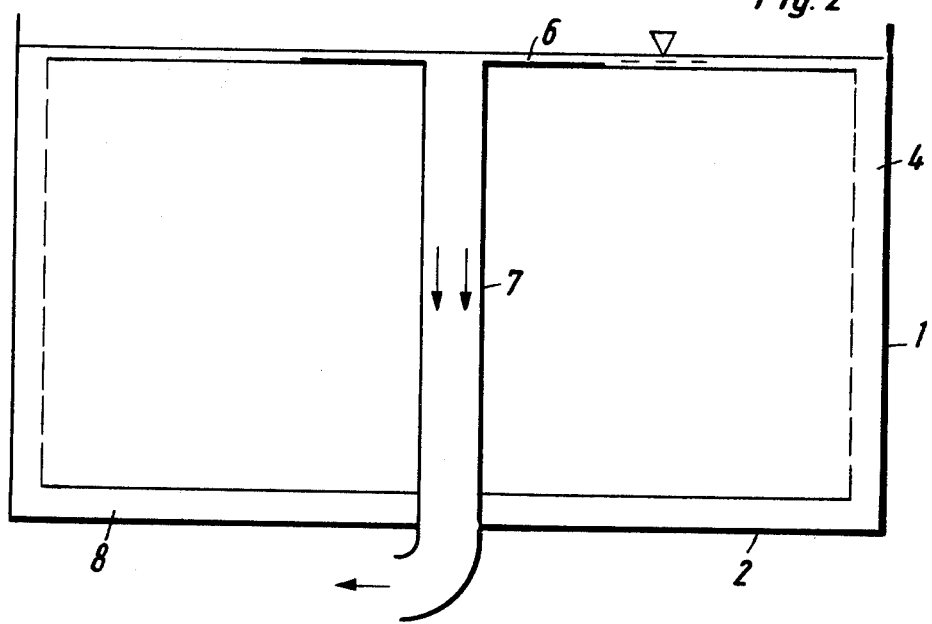

PROCESS AND APPARATUS FOR THE TREATMENT OF UNTREATED WATER

BACKGROUND OF THE INVENTION

I. Field of the Invention

The invention relates to a process and to an apparatus for the treatment of untreated water; for example, surface water, waste water, sewage and the like.

II. Description of the Prior Art

The treatment serves to remove substances causing turbidity contained in the untreated water in order to obtain clean water. This is brought about by adding a flocculating agent to the untreated water in order to form the substances causing turbidity into flakes which are separated by sedimentation. For this purpose, the untreated water mixed with the flocculating agent is passed through sedimentation tanks in which flake formation occurs and in which the flakes formed settle through sinking, while the flake-free untreated water rises upwards on flowing through the sedimentation tank and is removed from the water surface as clean water. On flowing through the sedimentation tank, the untreated water mixed with the flocculating agent must spend an adequate time in the tank in order to permit flake formation, while in the sedimentation tank there must be a vertically upwardly directed flow which must be smaller than the sinking speed of the flakes to be sedimented, so that they can be deposited on the tank bottom as sludge and the clean water can be drawn off from the water surface of the tank. The shapes and construction of the sedimentation tanks are determined by these requirements.

Various sedimentation tank constructions are known. In one version, which is in the form of a rectangular tank, the untreated water mixed with the flocculating agent is fed into the lower tank area at a narrow side and after flowing through the tank, the clean water is removed from the water surface at the opposite narrow side, while the sludge on the tank bottom resulting from the deposited flakes is intermittently removed by scraping or raking. In addition, cylindrical sedimentation tanks are known in which the untreated water is supplied from below into a chamber positioned centrally within the tank and which is equipped with agitating blades. The untreated water is removed below the water level from the chamber in a downwards direction into the tank in which flake formation and deposition occur, while the rising clean water is collected and removed by means of an overflow intersecting the water surface.

To ensure an optimum operation of the sedimentation tank, it must be ensured that a uniform throughflow is obtained which covers the entire cross-section of the tank, where they are only limited vertical flows permitting the sinking of the flakes. The loading capacity and therefore the efficiency of the complete sedimentation tank is reduced if even at a single point there is an increased upward movement. This is also the case if there are areas within the tank which are not covered by the through-flow, so that the entire available volume can not be utilized for sedimentation purposes.

In order to satisfy these requirements, all known sedimentation tanks require complicated and costly units for guiding the supplied water, without it being possible with absolute reliability to bring about, on the one hand, the necessary uniform flow over the entire tank cross-section and, on the other hand, a uniform upwardly directed flow with the necessary low speed, so that, despite the necessary expenditure, the capacity of known sedimentation tanks must always be made greater as a result of the irregularities which occur than would be necessary with completely satisfactory flow conditions.

SUMMARY OF THE INVENTION

The problem of the invention is to provide a process and an apparatus which ensures maximum flow conditions, while necessitating the minimum costs.

This problem is solved in a process using a cylindrical sedimentation tank in which the water mixed with the flocculating agent is introduced tangentially into the lower circumferential area of the tank such that the circumferential speed of the inflowing water is reduced to such an extent by braking that the occurrence of upwardly directed secondary flows is prevented and that the flake-free clean water is led off downwards through the center of the tank.

In the case of an azimuthal inflow of a liquid into a cylindrical tank, secondary flows necessarily occur leading to a vertical upward flow of liquid in the center of the tank. This is called the teacup effect. The occurrence of this secondary flow in the center of the tank, which is much greater in the upwards direction than the sinking speed of the flakes, has hereto made it impossible when sedimenting untreated water to work with an untreated water flow introduced tangentially into a cylindrical tank, despite the fact that the tangential introduction into the tank leads to a uniform flow through the tank radially towards the center, while utilizing the entire tank volume.

The inventive activity of the Applicant was required to brake the inflow circumferential speed of the untreated water to such an extent that the downwardly directed secondary flows on the circumference and the upwardly directed secondary flows in the center of the tank leading to the so-called teacup effect were prevented, so that in the center of the tank the flakes formed are deposited on the tank bottom and clean water can be led off downwards through the center of the tank.

The apparatus used for performing the process is characterized in that the tank has at least one feed connection directed tangentially to its cylindrical wall, that in the tank there is provided a partition whose cylindrical circumferential wall forms an annular clearance which passes through the tank into the vicinity of the bottom thereof and which has perforations distributed over the circumference thereof, and that in the center of the tank there is a pipe which passes axially through the tank bottom and whose upper end carries a circular overflow disc located centrally below the water level of the tank.

A further feature of the apparatus is that the partition comprises a plurality of perforated plates joined together to form a cylinder and that the number and size of the perforations are adapted to the different operating states occurring on the individual plates.

A modified embodiment of the apparatus is characterized in that the partition comprises an upper and a lower ring between which there are guide plates which form openings which are distributed over the circumference of the partition and are attached to the ring inner surfaces. It is advantageous for the guide plates to be inclined in the opposite directions to the untreated water flowing into the tank.

Finally, it is important that a gap is provided for receiving a scraping rake between the tank bottom and the lower end of the partition.

As a function of the necessary volume flow and the tank size determined by this arrangement, one or more tangentially directed feed connections can be provided on the cylindrical tank wall, it being advantageous when a plurality of feed connections are provided for them to be uniformly distributed over the cylindrical tank wall circumference. On passing out of the feed connection or connections, the inflowing untreated water comes into contact with the perforated partition which brings about a reduction in the circumferential speed due to the friction on the surface of the partition and on the front edges of the perforations oppositely directed to the flow direction, whereby the untreated water is forced to flow through the perforations. This braking of the circumferential speed of the supplied untreated water due to the perforated partition prevents the teacup effect from occurring in the center of the tank and, instead, there is an upward flow in the center of the tank under the action of the water which preferably flows tangentially out of the lower circumferential area of the tank. The outflowing water speed is lower than the sinking speed of the flakes, so that the flakes formed can settle on the tank bottom before being raked out in a per se known manner. A braking of the circumferential speed of the untreated water supplied and an upward flow in the central area of the tank at a speed below the flake sinking speed can also be obtained if the partition formed by perforated plates is replaced with guide plates whereby, as a function of the particular operating conditions, the guide plates can have different lengths and different inclinations, as well as different reciprocal spacings.

The clean water rising in the center of the tank is introduced into the pipe by a circular plate fixed to the open end of a pipe which passes downwards through the tank. This plate is positioned below the tank water level so that there is no need for providing an overflow edge which disects the water level. This arrangement of the plate has the advantage that sedimentation can also take place in a satisfactory manner at temperatures below freezing point which was not possible with the heretofore necessary overflow edge intersecting the water surface due to the resulting icing risk.

It is obvious that for obtaining a uniformly braked flow speed in the sedimentation tank, the diameter and the number of the perforations and consequently the screen area of the perforated wall for the passage of water cannot be uniformly distributed over the entire circumference and are instead dependent on certain factors. Thus, for example, the perforated wall must be constructed differently when one feed connection is used than when two, three or more feed connections are used. Furthermore, considered in the height of the partition, the diameter and number of perforations can also not be uniform as a function of the height position in which the untreated water is fed into the tank. The size and number of the perforations must be matched to the particular operating conditions.

It is advantageous to construct the partition from individual rectangular perforated plates, which can be matched to the operating conditions in the tank by their arrangement, for example, with respect to their distance from the inflow point. By joining together correspondingly matched perforated plates, it is possible to obtain a partition which is accurately adapted to the particular operating conditions, so that flow irregularities are avoided. There is no need to provide special guide members for guiding the water flow because, as a result of the perforated partition arranged in accordance with the invention, a uniform radial flow towards the center of the tank is obtained on which is superimposed an angular momentum, whereby there is an upwardly directed flow which is smaller than the sinking speed of the flakes.

When using a partition formed from the guide plates, it is obviously necessary to match the distance between the plates and their inclination to the prevailing conditions and both the spacings and inclinations can differ over the circumference. By corresponding adjustments of the inclinations of the individual guide plates, the original angular momentum of the inflowing liquid can be reduced to a residual twist dimension in such a way that the speed of the water rising in the center of the tank is less than the sinking speed of the flakes. By means of guide plates arranged according to the invention, it is even possible to obtain an angular momentum within the tank directed oppositely to the angular momentum of the inflowing untreated water. The guide plates permit a better and more rapid adaptation to different operating conditions if the inclination-adjustable plates are arranged on the two annular bands, which can be achieved without difficulty.

The process according to the invention and the apparatus for performing this process are advantageous with respect to the known processes and apparatus in that constructional expenditure is greatly reduced, the container tank is completely utilized as a sedimentation zone, an accurate regulation of the flow through the tank is ensured by corresponding construction of the perforated plate partition, there are no inclined surfaces on which flakes could be deposited and, finally, there is a complete utilization of the surface area provided by the tank.

BRIEF DESCRIPTION OF THE DRAWINGS

The attached drawings diagrammatically illustrate the apparatus for performing the process according to the invention and show:

FIG. 1 is a diagramatic plan view of the apparatus;

FIG. 2 is a cross-sectional view through FIG. 1;

DESCRIPTION OF THE PREFERRED EMBODIMENTS

Figure 3:
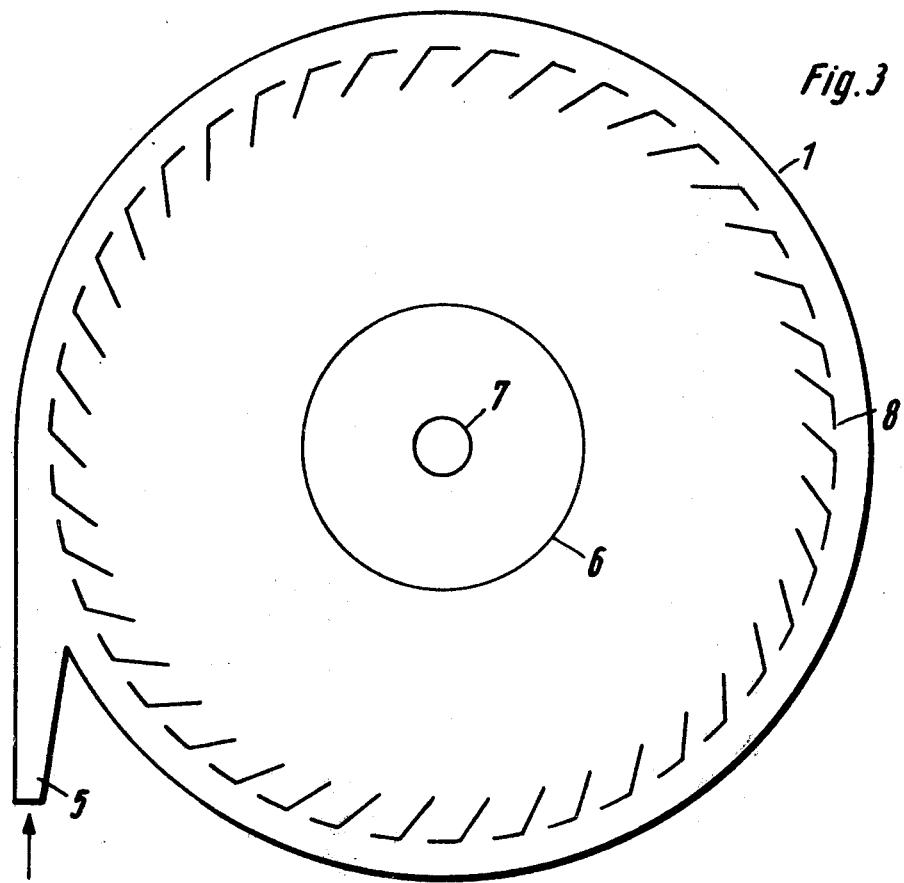
FIG. 3 is a view, corresponding to FIG. 1, of a modified embodiment of the apparatus.

FIGS. 1 and 2 show a cylindrical tank 1 equipped with a bottom 2. A cylindrical partition 3 formed from perforated plates is placed in the cylindrical tank and an annular clearance is thereby formed. The partition 3 passes through the tank 1 forming a space 8 on the bottom 2 which serves for the positioning of a, not shown, rotary scraping rake located on bottom 2 and which is used for removing flakes which have settled on the bottom. A pipe 7 which is open at the top and passes through the bottom 2 of tank 1 is arranged in the center of tank 1 and axially disposed thereon. On the top end of pipe 7 there is provided an annular disc 6 which serves as a flange and which is located below the water level in tank 1. The untreated water to be sedimented as fed into the tank 1 tangentially via a feed connection 5. The circumferential speed of the water flowing in through feed connection 5 is reduced to such an extent by partition 3 that from the entire circumference there is a radially inwardly directed flow on which is superimposed a residual angular momentum remaining through partition 3 and which, in the vicinity of the center of the tank, changes into a vertically upwardly flow, whose speed is lower than the sinking speed of the flakes, which have dropped when flowing through the space surrounded by partition 3 and have been deposited on the tank bottom 2. The sedimentation tank according to the invention can also operate at low temperatures and as a result sedimentation can be maintained even when ice forms. This is even the case if the tank surface is covered by an ice layer, because plate 6 is located below the water level and therefore below the ice layer formed, thereby ensuring a completely satisfactory removal of the clean water at freezing temperatures.

Figure 4:
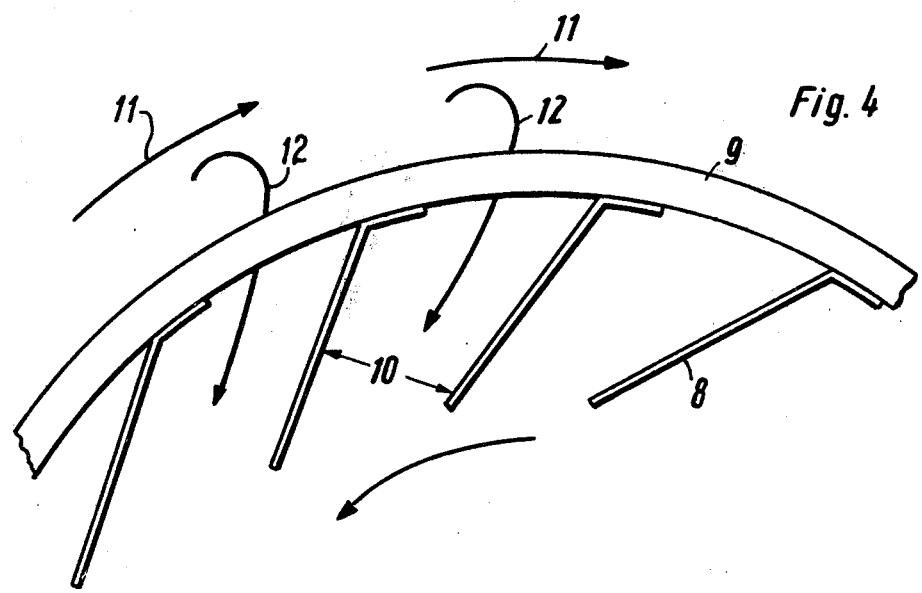
FIG. 4 is a larger scale plan view according to FIG. 3.

FIGS. 3 and 4 show a modified embodiment in which partition 3, formed from perforated plates according to FIG. 1, is replaced by a partition formed by guide plates 8 arranged between an upper and a lower ring 9 and fixedly distributed over the inner circumference of the tank. A vertical opening 10 for the untreated water is formed between two adjacent guide plates 8. The guide plates 8 are directed in opposition to the untreated water flowing into the tank in the directions of the arrows 11, so that the direction of the angular momentum indicated by these arrows 11 is reversed, as shown by arrows 12, so that within the tank 1 there is a backtwist which, by a corresponding setting of the inclinations of the guide plates 8, can be dimensioned in such a way that the completely satisfactory sinking of the flakes is ensured.

What is claimed is:

1. An apparatus for the treatment of untreated water containing substances causing turbidity in a cylindrical tank by sedimentation using a flocculating agent added to the water causing said substance in the water to form into flakes, in which the water flows through the tank and after an adequate residence time is removed from the water surface of the tank at a rising speed which is less than the sinking speed of the flakes, said apparatus comprising:

a cylindrical tank;
   one feed connection in the tank directed tangentially at the lower portion of the circumferential wall of the tank;
   a cylindrical partition disposed in the tank, the circumferential wall of the partition forming an annular clearance with the circumferential wall of the tank;
   a bottom wall of the tank and a lower end of the partition spaced apart placing the lower end of the annular clearance in free communication with the center of the tank;
   the partition having perforations distributed over the circumference thereof such that the water mixed with the flocculating agent is introduced tangentially into the circumferential area of the tank and the circumferential speed of the inflowing water is reduced to such an extent by braking as it passes radially through the partition that the occurrence of upwardly directed secondary flows is prevented; and
   a pipe disposed in the tank including an inlet near the top of said tank, the pipe passing axially through the tank bottom and carrying a circular overflow disc at its upper end disposed at substantially the same level as the upper end of said partition of the tank such that clean water is led off downwards through the center of the tank.

2. The apparatus of claim 1 wherein the partition comprises a plurality of perforated plates joined together to form a cylinder and the number and size of the perforations are adapted to the different operating states occurring on the individual plates.

3. The apparatus of claim 1 wherein the partition comprises an upper and a lower ring between which are provided guide plates attached to the ring inner surfaces, the guide plates forming openings which are distributed over the circumference of the partition.

4. The apparatus of claim 3 wherein the guide plates are inclined in the opposite direction to the untreated water flowing into the tank.

5. The apparatus of claim 2 wherein the bottom of the tank and the lower end of the partition are spaced apart to form a gap for receiving a scraping rake.

6. A process for the treatment of water containing substances causing turbidity in a cylindrical tank comprising the steps of:

(1) adding flocculent to the water in order to form said substances causing turbidity into flakes;
   (2) passing the flocculent containing water tangentially into the lower periphery of the tank into an annular clearance formed by a perforated cylindrical partition and the circumferential wall of the tank, the lower end of said partition being spaced apart from the bottom wall of said tank placing the lower end of said annular clearance in free communication with the center of the tank;
   (3) directing the water radially inward through said perforated cylindrical partition to reduce the circumferential speed of the inflowing water sufficiently to prevent the occurrence of upwardly directed secondary flows;
   (4) maintaining the flocculent containing water in the tank for an adequate time for said flakes to form;
   (5) allowing said flakes to be deposited at the bottom of said tank;
   (6) drawing clean water through a centrally disposed overflow in said tank beneath the water surface in the tank, said overflow being at substantially the same level as the upper end of said partition.

* * * * *